United States Patent

Wexell

[11] 4,098,610
[45] Jul. 4, 1978

[54] BIOCIDAL GLASS ADDITIVE FOR MARINE PAINTS

[75] Inventor: Dale R. Wexell, Corning, N.Y.

[73] Assignee: Corning Glass Works, Corning, N.Y.

[21] Appl. No.: 799,189

[22] Filed: May 23, 1977

[51] Int. Cl.² .......... C03C 3/04; C03C 3/14; C03C 3/30; C09D 5/14
[52] U.S. Cl. .......... 106/47 R; 106/15 R; 106/48; 106/52; 106/54; 428/149; 428/432
[58] Field of Search .......... 106/47 R, 52, 54, 15 R, 106/48

[56] References Cited

U.S. PATENT DOCUMENTS

| | | | |
|---|---|---|---|
| 2,477,649 | 8/1949 | Pincus | 106/47 R |
| 3,100,718 | 8/1963 | Dunn et al. | 106/15 R |
| 3,100,719 | 8/1963 | Dunn et al. | 106/15 R |
| 3,385,915 | 5/1968 | Hamling | 106/50 |
| 3,413,133 | 11/1968 | Stalego | 106/50 |
| 3,476,577 | 11/1969 | Davie | 106/15 R |
| 3,528,842 | 9/1970 | Skadulis | 106/15 R |
| 3,883,358 | 5/1975 | Malmendier | 106/47 R |
| 4,042,402 | 8/1977 | Drake et al. | 106/15 R |

FOREIGN PATENT DOCUMENTS

1,149,141   5/1963   Fed. Rep. of Germany ......... 106/48

OTHER PUBLICATIONS

Weyl, W. A.-Coloured Glasses-(1959) London-Dawson's of Pall Mall p. 160.
Morey, G. W.-The Properties of Glass-(1954) N.Y.-Reinhold Pub. Corp. pp. 123 and 488-491.

*Primary Examiner*—Helen M. McCarthy
*Attorney, Agent, or Firm*—Clinton S. Janes, Jr.; Clarence R. Patty, Jr.

[57] ABSTRACT

This invention relates to the production of borate-based or silicate-based glasses containing copper which are operable as biocidal additives in marine anti-fouling coatings. Zinc and/or tin may be substituted for a portion of the copper or, if present in combination at high loadings, may be substituted in total for the copper. When dispersed in the standard film forming binders employed in marine paints, the rate of solution of the metal ion in salt water is in excess of 10 mg/m²/day.

3 Claims, No Drawings

BIOCIDAL GLASS ADDITIVE FOR MARINE PAINTS

BACKGROUND OF THE INVENTION

An outline of the progression and mechanism of ship hull fouling in sea water, with discussions concerning types of organisms involved ad corrosion effects, can be found in *corrosion Handbook*, W. F. Clapp, John Wiley and Sons, Inc., New York, 1948, and *World Atlas of Coastal Biological Fouling* — Part 1, E. J. Pastula, Naval Oceanographic Office, Washington, D. C., 1R No. 70-51, 1970. Thus, marine growth on metal surfaces freshly immersed in sea water customarily follows a definite pattern. Bacteria dominate the new surface for about the first 3 days and are succeeded by algae slimes between about the third and seventh days. The next 2 weeks see protozoans taking over and, by the third week, barnacles are becoming firmly established. Tunicates appear between about the tenth and sixteenth weeks after which grasses predominate until about the sixth month. Thereafter, mussels are seen to have taken a firm hold. Unfortunately, these fouling organisms are cumulative such that buildup on the hull of a ship is quite rapid.

One inch depth of fouling adversely affects the streamlining of a ship's hull, weighs much, ruins skin smoothness, and greatly alters corrosion processes that are taking place on structural members and component parts. In addition, these organism may cuase plugging problems in condensers, pipelines, and valves exposed to contact with sea water. Finally, this marine growth can exert a significant effect on friction coefficient and pumping efficiencies for sea water handling systems. Such circumstances have the very practical effect of requiring commercial shippers to reckon on increases in fuel consumption depending upon the length of time since the last haulout for hull cleaning. For example, a 1% increase in power is typically required for each 4 days after haulout. This results in the need for a 22% increase after about 3 months and more than a 45% increase in 6 months.

Wooden vessesl are also subject to attack by *Toredo navalis* and other organism, e.g., Limnoria, which bore into wood in populations of up to 5000/ft.$^2$. The Teredo worm commonly lives for about 2 ½ months, boring a hole about 6 inches in length and ¼ inch in diameter. These organism are present in essentially all areas of the oceans.

The two areas of a ship's hull which require special coatings are the bottom and the boat-topping area. The boat-topping area, being intermittently exposed to both air and sea water, present and especially difficult surface to protect from the elements and marine organisms.

For use as anti-fouling coatings on ship bottoms, copper, mercury, and/or tin compounds are frequently incorporated into binders which are somewhat water sensitive. Gradual breakdown of the binder occurs which affords a sustained release of the toxic metal compounds. A tin-based toxic biocide has been recommended for aluminum hulls and outboard lower units. Copper will destroy aluminum by galvanic action and the contact of aluminum with the copper agent will, as with other metals less noble than copper, render the copper ineffective as an anti-foulant. Therefore, a copper-containing coating must be insulated from the aluminum (or steel) hull by an anti-corrosion coating to prevent migration of copper ions thereto and causing oxidation of the metal hull.

The binders in ship bottom paints customarily comprise either a porous type or one having a surface which continually washes away. The former, denominated the "hard" type, usually has either a vinyl or epoxy vehicle chemistry. The latter or "soft" type normally has a pine tar or gum base and is somewhat less hazardous to apply.

In general, the binders for boat-topping paints are designed to provide a high level of resistance to both salt water and weather. Phenolic resin-tung oil and vinyl resin combinations have commonly beeen utilized.

A glass additive containing a biocidal agent can offer several advantages over the present commercially-marketed anti-fouling coatings:

(1) the glass composition can be tailored such that the metal ion constituent of the coating will not leach or diffuse into the aquatic environment at an excessive rate;

(2) the coating can be designed to remain effective for a longer period of time than the normal 3–18 month life span of the conventional coatings;

(3) the overall cost of the coating can be cheaper but with the same degree of efficiency; and (4) the glass-containing coating will be less polluting since the conventional coatings leach out relatively rapidly in sea water, thereby contributing heavy loads of metal in harbors.

SUMMARY OF THE INVENTION

I have discovered two groups of glass compositions which, when incorporated into marine paints, provide a controlled release of toxic agents, such as copper, tin, and/or zinc ions, into the adjacent sea water, thereby inhibiting the attachment of barnacles and other marine growth to structures subjected to contact with sea water.

The first group, wherein $SiO_2$ constitutes the primary network forming ingredient, comprises glasses consisting essentially, as expressed in weight percent on the oxide basis, of about 30–65% $SiO_2$, 10–25% $R_2O$, wherein $R_2O$ consists of 0–25% $Na_2O$, 0–25% $K_2O$, and 0–10% $Li_2O$, 0–15% $BaO$, and 0–50% $CuO + ZnO + SnO_2$ consisting of 0–50% $CuO$, 0–35% $ZnO$, and 0–20% $SnO_2$, at least 10% $CuO$ being present unless the sum of $ZnO + SnO_2$ exceeds about 30%. The copper content is reported in terms of $CuO$ because the percentage of the biocidal monovalent copper in the glass is dependent upon the conditions employed in melting the batch ingredients, i.e., the time and temperature of melting, the severity of the reducing environment, etc. The optional inclusion of up to 15% $B_2O_3$ and/or up to 15% $P_2O_5$ and/or up to 8% F, the sum of those additions not exceeding about 15%, can be useful as melting aids and/or in regulating the degree and rate of surface hydrolysis of the glass when in contact with sea water. The inclusion of substantial amounts of $P_2O_5$ in the glass, however, appears to increase the growth of algae, but does not seem to encourage the growth of barnacles, mussels, or tunicates. In any event, since $P_2O_5$ may partially counteract the biocidal activity of the copper, tin, and zinc ions, its additions should be used with discretion.

The second group of compositions, wherein $B_2O_3$ constitutes the principal network forming component, comprises glasses consisting essentially, as expressed in weight percent on the oxide basis, of about 40–65%

$B_2O_3$, 5–15% $Al_2O_3$, 0–15% $R_2O$, wherein $R_2O$ consists of 0–15% $Na_2O$, 0–15% $K_2O$, and 0–10% $Li_2O$, 0–15% BaO, and 0–50% CuO + ZnO + $SnO_2$ consisting of 0–50% CuO, 0–35% ZnO, and 0–20% $SnO_2$, at least 10% CuO being present unless the sum of ZnO + $SnO_2$ exceeds about 30%. The copper content is again reported as CuO since the actual content of $Cu^+$ ions in the glass is a function of the reducing conditions utilized during melting. The presence of $Al_2O_3$ imparts durability to the glass and the optional inclusion of up to 15% $P_2O_5$ can be useful in providing stability to the glass as well as assisting in regulating the degree and rate of surface hydrolysis exhibited by the glass when exposed to sea water. Again, however, its inclusion should be made judiciously. Up to about 5% F may be advantageous as a melting aid. However, the sum of those components will not exceed about 15%.

The most preferred glasses in both groups of compositions for biocidal activity are those containing a minimum of alkali metal, since their presence can reduce the activity of the copper, tin, and zinc ions. The inclusion of alkali metal ions is desirable, however, to provide sufficient flux to melt glasses containing substantial amounts of copper, tin, and zinc. Likewise, whereas the alkaline earth metals other than barium can be useful as melting aids and/or as glass stabilizers, they appear to counteract to some extent the biocidal activity of the copper, tin, and zinc. Particularly does this phenomenon seem to be present with calcium ions. Therefore, the most preferred glasses will be free from alkaline earth metals other than barium, and the total of such which can be tolerated is about 10%.

DESCRIPTION OF PREFERRED EMBODIMENTS

The following table records glass compositions, expressed in terms of parts by weight on the oxide basis, exemplifying the parameters of the instant invention. Inasmuch as the sum of the ingredients in the individual compositions totals or closely approximates 100, the weight reported can be deemed to represent weight percents for all practical purposes. Also, since it is not known with which cation(s) the fluoride is combined in the glass structure, it is simply reported as fluoride (F), in accordance with conventional glass analysis practice. Finally, the actual batch ingredients can comprise any materials, either the oxide or other compound, which, when melted together with the other ingredients, will be coverted into the desired oxide in the proper proportions.

The batch ingredients were compounded, a carbon-containing material such as starch or sugar being included in amounts between about 1–5% by weight to insure strong reducing conditions, the ingredients ball-milled to aid in achieving a homogeneous melt, and then placed in silica crucibles. Glass compositions containing large amounts of copper are not normally melted in platinum crucibles except under highly oxidizing conditions. In these glasses, the copper must be in a reduced condition for biocidal activity. After covering, the crucibles were moved to a furnace operating at about 1600° C. and the batches melted for about 4–6 hours. The melts were thereafter poured into water ("drigaged") to produce finely-divided particles of glass.

TABLE

| | 1 | 2 | 3 | 4 | 5 | 6 | 7 | 8 | 9 | 10 |
|---|---|---|---|---|---|---|---|---|---|---|
| $Na_2O$ | — | 14.07 | 13.97 | 13.87 | 13.24 | 20.0 | 10.0 | 10.5 | 14.63 | 10 |
| $SiO_2$ | 61.21 | 65.70 | 60.56 | 55.47 | 52.91 | 45.0 | 63.0 | 63.5 | 52.47 | 56 |
| CuO | 18.35 | 19.69 | 19.55 | 19.42 | 18.51 | 5.0 | 22.0 | 15.0 | 32.34 | 15 |
| $B_2O_3$ | — | — | 5.40 | 10.74 | 5.21 | 5.0 | — | — | — | 10 |
| $P_2O_5$ | — | — | — | — | 10.22 | — | — | — | — | — |
| F | 0.50 | 0.53 | 0.52 | 0.52 | 0.50 | — | — | 1.0 | 0.55 | — |
| $K_2O$ | 19.94 | — | — | — | — | — | — | — | — | — |
| BaO | — | — | — | — | — | — | 5.0 | 10.0 | — | — |
| MgO | — | — | — | — | — | — | — | — | — | — |
| ZnO | — | — | — | — | — | 10.0 | — | — | — | 5 |
| $SnO_2$ | — | — | — | — | — | 20.0 | — | — | — | 4 |
| Density (g/cc) | — | — | — | — | — | 2.91 | — | — | — | — |

| | 11 | 12 | 13 | 14 | 15 | 16 | 17 | 18 | 19 | 20 | 21 |
|---|---|---|---|---|---|---|---|---|---|---|---|
| $Na_2O$ | 15.0 | — | 14.0 | 18.0 | 20.5 | 14.0 | 14.0 | 17.2 | 14.0 | 15.0 | 13.0 |
| $SiO_2$ | 45.0 | — | 42.5 | 48.0 | 47.5 | 57.6 | 54.2 | 49.1 | 49.9 | 45.0 | 32.0 |
| $B_2O_3$ | 10.0 | 45.0 | 7.0 | 6.0 | 5.5 | — | 5.8 | 4.9 | 5.3 | 10.0 | 5.0 |
| CuO | 16.1 | 46.0 | — | 27.5 | 12.7 | 22.9 | 26.2 | 14.7 | 30.8 | 15.6 | 20.1 |
| ZnO | 15.0 | — | 24.0 | — | 7.5 | — | — | — | — | 15.0 | 30.0 |
| $Al_2O_3$ | — | 10.5 | — | — | — | — | — | — | — | — | — |
| $SnO_2$ | — | — | 12.0 | — | — | — | — | 14.1 | — | — | — |
| F | — | — | — | 7.0 | 4.0 | 7.0 | 2.0 | — | — | — | — |
| Density (g/cc) | 2.98 | 2.69 | 3.11 | 2.96 | 2.71 | 2.92 | 2.95 | 3.48 | 2.90 | — | — |

Each group of glass compositions is designed such that there is a gradual solution thereof in sea water, permitting the release of at least 10 mg/m² of surface area/day of the biocidal metal ions. Controlled experiments of simulated hull exposure have evidenced that the rate of solution of about 10–30 mg of the biocidal metal ions/m²/day satisfactorily inhibits marine growth. Faster rates of release simply exhaust the metal ions more rapidly with no improvement in efficacy. It is apparent that the base glass composition must be sufficiently durable to preclude rapid leaching or diffusion into sea water with consequent loss of the biocidal metal ions.

Various test procedures have been devised to simulate ship hull exposure to sea water. A rather extensive discussion of such testing is presented by Johnsen and Rendbaek in "A Screening Method for Bio-active Materials in Antifouling Paints", *Fourth International Congress on Corrosion and Fouling*", Guar Les Peirs, France, pages 259–266 (1976). The substrates commonly utilized as test samples are prepared from a stainless steel, although other materials such as concrete, wood, and plastics can be substituted therefor.

The base coating into which a biocidal ingredient is incorporated will generally have a soft and tacky consistency as applied, but later hardens and is durable when immersed into sea water. When the substrate is a metal, the base coating will also provide protection against corrosion. One base coating material which has been used extensively is a coal tar-epoxy resin combination as described in U.S. Pat. No. 2,765,288. However, numerous other base coatings have been tried including molten and solution forms of thermoplastic and thermosetting materials, e.g., vinyls, rubber base and alkyd base materials, straight epoxies and polyesters. Phenolic resins can be baked on the substrate after the toxicant has been suspended therein.

In carrying out one particular test procedure, the glass particles are combined with an inert binder, preferably a vinyl chloride-vinyl acetate copolymer in ketone-xylene, but other binders are also useful. The test composition is designed to yield a non-volatile composition of about 74% by weight bioactive material and 26% by weight vinyl resin. The composition is ball-milled to $20\mu$ (Hegman scale) and applied to polyvinyl test panels by dipping to give a $50\mu$ or $100\mu$ dry film thickness. After drying, the test panels with the $50\mu$ and $100\mu$ thick coatings, respectively, are immersed into the ocean in the following positions:

(1) horizontally at a depth of about 30 cm where the primary marine growth is green algae; and (2) vertically at a depth of about 150 cm where the principal marine life consists of barnacles and brown algae. Where the reaction on wood is to be studied, test panels of soft pine will be substituted for the polyvinyl chloride panels.

The difference in coating thickness, i.e., the $50\mu$ vis-a-vis the $100\mu$ coating, provides an indication of the solubility of the bio-active material being tested. Thus, if both systems fail at about the same time, the solubility is either too low to prevent settling or so high that all material is quickly lost. On the other hand, if the $100\mu$ system inhibits fouling for a much longer period than the $50\mu$ coating, the solubility is of the proper order of magnitude.

I claim:

1. Finely divided particles of glass suitable as a biocidal additive to coating subjected to marine environments exhibiting a rate of solution in sea water such that biocidal metal ions are released at a rate of at least 10 $mg/m^2$ of surface area/day, said glass having a composition selected from the groups consisting of $SiO_2$-based glasses and $B_2O_3$-based glasses, said $SiO_2$-based glasses consisting essentially, as expressed in weight percent on the oxide basis, of about 30–65% $SiO_2$, 10–25% $R_2O$, wherein $R_2O$ consists of 0–25% $Na_2O$, 0–25% $K_2O$, and 0–10% $Li_2O$, 0–15% BaO, and 0–50% CuO + ZnO + $SnO_2$ consisting of 0–50% CuO, 0–35% ZnO, and 0–20% $SnO_2$, the copper reported as CuO being present in the glass as $Cu^+$ ions, at least 10% CuO being present unless the sum of ZnO + $SnO_2$ exceeds about 30%, and said $B_2O_3$-based glass consisting essentially, as expressed in weight percent on the oxide basis, of about 40–65% $B_2O_3$, 5–15% $Al_2O_3$, 0–15% $R_2O$, wherein $R_2O$ consists of 0–15% $Na_2O$, 0–15% $K_2O$, and 0–10% $Li_2O$, 0–15% BaO, and 30–50% ZnO + $SnO_2$ consisting of 10–35% ZnO and 0–20% $SnO_2$.

2. A biocidal glass according to claim 1 wherein said $SiO_2$-based glass also contains up to about 15% $B_2O_3$ and/or up to about 15% $P_2O_5$ and/or up to about 8% F, the sum of those components not exceeding about 15%.

3. A biocidal glass according to claim 1 wherein said $B_2O_3$-based glass also contains up to about 15% $P_2O_5$ and/or up to about 5% F, the sum of those components not exceeding about 15%.

* * * * *

UNITED STATES PATENT AND TRADEMARK OFFICE
CERTIFICATE OF CORRECTION

PATENT NO. : 4,098,610
DATED : July 4, 1978
INVENTOR(S) : Dale R. Wexell

It is certified that error appears in the above-identified patent and that said Letters Patent are hereby corrected as shown below:

Column 1, line 8, "ad" should be -- and --.

Column 1, line 43, "vessel" should be -- vessels --.

Column 6, Claim 1, line 5, "coating" should be -- coatings --.

Signed and Sealed this

Fifteenth Day of May 1979

[SEAL]

Attest:

RUTH C. MASON
Attesting Officer

DONALD W. BANNER
Commissioner of Patents and Trademarks